United States Patent
Hoffmann et al.

(10) Patent No.: US 6,906,439 B2
(45) Date of Patent: Jun. 14, 2005

(54) SPINDLE MOTOR WITH CASING PART IN HARD DISK DRIVES

(75) Inventors: Jörg Hoffmann, Mettlach (DE); Martin Hafen, Villingen-Schwenningen (DE); Matthias Wildpreth, Villingen-Schwenningen (DE)

(73) Assignee: Minebea Co., Ltd., Tokyo (JP)

( * ) Notice: Subject to any disclaimer, the term of this patent is extended or adjusted under 35 U.S.C. 154(b) by 0 days.

(21) Appl. No.: 10/152,217

(22) Filed: May 21, 2002

(65) Prior Publication Data

US 2002/0185924 A1 Dec. 12, 2002

(30) Foreign Application Priority Data

May 25, 2001 (DE) .................................. 201 08 787 U

(51) Int. Cl.⁷ .................................................. H20K 9/00
(52) U.S. Cl. ........................ 310/90; 310/67 R; 310/91
(58) Field of Search ............................... 310/90, 67 R, 310/91

(56) References Cited

U.S. PATENT DOCUMENTS

| | | | |
|---|---|---|---|
| 5,598,048 A | | 1/1997 | Dunfield et al. |
| 5,668,427 A | * | 9/1997 | Morita ........................ 310/216 |
| 5,751,080 A | | 5/1998 | Hong |
| 5,783,886 A | | 7/1998 | Hong |
| 5,896,242 A | * | 4/1999 | Albrecht ..................... 360/99.8 |
| 6,069,429 A | | 5/2000 | Yamamoto et al. |
| 6,455,965 B2 | * | 9/2002 | Akahori ........................ 310/90 |
| 6,563,243 B2 | * | 5/2003 | Obara ........................... 310/90 |

* cited by examiner

Primary Examiner—Darren Schuberg
Assistant Examiner—Iraj A. Mohandesi
(74) Attorney, Agent, or Firm—Myron Greenspan, Esq.; Lackenbach Siegel LLP

(57) ABSTRACT

The invention relates to a spindle motor comprising a casing part with a horizontal flange portion and a vertically oriented receiving sleeve for receiving and fastening a corresponding bearing configuration. According to the invention a bottom portion, integrally connected with the horizontal flange portion, is provided, which unilaterally closes the receiving sleeve. Consequently, the mounting of a separate cover for closing the receiving sleeve can be omitted.

6 Claims, 5 Drawing Sheets

SPINDLE MOTOR WITH CASING PART IN HARD DISK DRIVES

BACKGROUND OF THE INVENTION

1. Field of the Invention

The invention relates to a spindle motor with a casing part (base plate, flange and the like), preferably for application in hard disk drives, wherein the casing part comprises in the proximity of the motor a flange region which, as a rule, is horizontal, in the center of which a sleeve is disposed for receiving the rotor pivotably supported by means of corresponding bearings. In known manner the sleeve is open on both sides and serves, as already stated, for receiving the pivotably supported rotor, wherein in each instance the stationary part of the bearing configuration, with which the rotor is pivotably supported relative to the casing, is secured on the inside of the receiving sleeve. In the case of rolling bearings these can be, for example, the outer ring(s); in the case of a fluid-lubricated radial bearing, this would analogously be the bearing bushing.

2. Description of the Prior Art

To protect the bearing configuration and in order to prevent the penetration of particle-loaded ambient atmosphere into the hard disk drive, it is known within prior art, as depicted in FIG. 4, to close the lower opening of the receiving sleeve with a cover. This cover is preferably adhered on the lower margin of the receiving sleeve, such that a good sealing of the receiving sleeve against the outside results.

According to prior art for this purpose a cover developed substantially as a disk-form body, if needed with an encircling edge, is set into the correspondingly recessed receiving sleeve, fastened with adhesive agent and sealed. Of disadvantage herein is that the cover must be adhered in a separate operating step with additional installation space needing to be provided in order to be able to accommodate the cover and adhere it. Thereby the effective axial height available for the electric drive is reduced.

In U.S. Pat. No. 5,783,886 is disclosed a casing part of a spindle motor with unilaterally closed receiving sleeve, wherein for the pivot bearing of the rotor a passive magnet bearing configuration is employed, which is not comparable with a rolling bearing employed according to the invention.

SUMMARY OF THE INVENTION

The object of the invention comprises developing further a spindle motor with casing part and a rolling bearing configuration such that the above described disadvantages with respect to operating expenditure and space requirement in connection with the insertion of a cover are avoided.

This object is attained according to the invention through the characteristics of patent claim 1.

Accordingly, the spindle motor comprises a casing part with a horizontal flange portion, a vertically oriented receiving sleeve for receiving and fastening a bearing configuration comprised of two rolling bearings with at least one inner ring and one outer ring for the bearing of a shaft supporting a rotor, and a bottom portion integrally connected with the horizontal flange portion, which unilaterally closes the receiving sleeve at whose inner periphery the common outer ring of the bearing configuration is fastened.

This structuring of the receiving sleeve has the advantage that the receiving sleeve, on the one hand, is completely protected toward the outside against penetration of dirt and, on the other hand, the mounting of a separate cover as well as the succeeding adhering and sealing of the cover becomes entirely superfluous. This yields a reduction of the required mounting expenditure. A further advantage comprises that through the covering integrated into the casing part the rigidity of this casing part is increased, which improves the running properties of the spindle motor. Further, the effective axial height of the casing part can be reduced since the integrated covering occupies (substantially) less axial installation space than is required for the insertion of a separate cover.

The bottom closing the receiving sleeve preferably has a lesser thickness, is even developed such that it is substantially less, than the horizontal flange portion itself.

BRIEF DESCRIPTION OF THE DRAWINGS

In the following the invention will be described in further detail in conjunction with embodiment examples with reference to the drawings. Further characteristics, advantages and application forms of the invention become evident herein. In the drawings depict.

DESCRIPTION OF THE PREFERRED EMBODIMENTS

Figure 1:
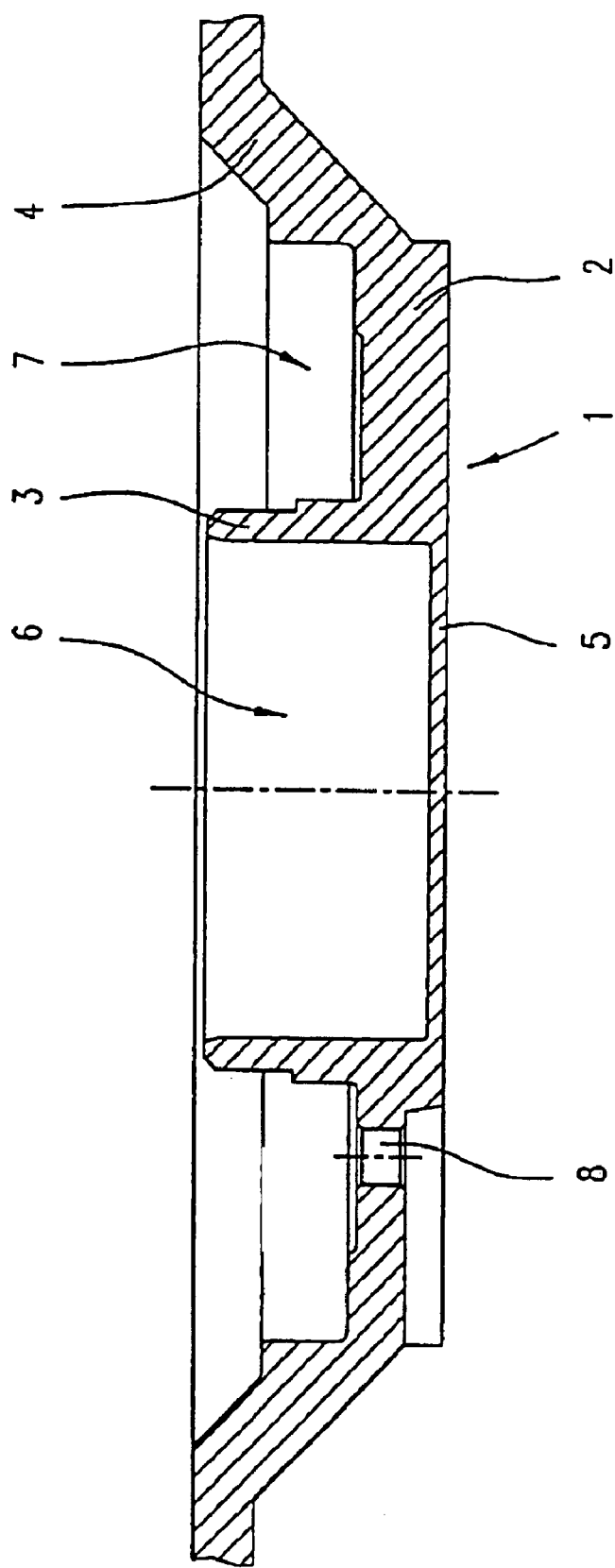
FIG. 1: section through a casing part with unilaterally closed receiving sleeve.
Figure 3:
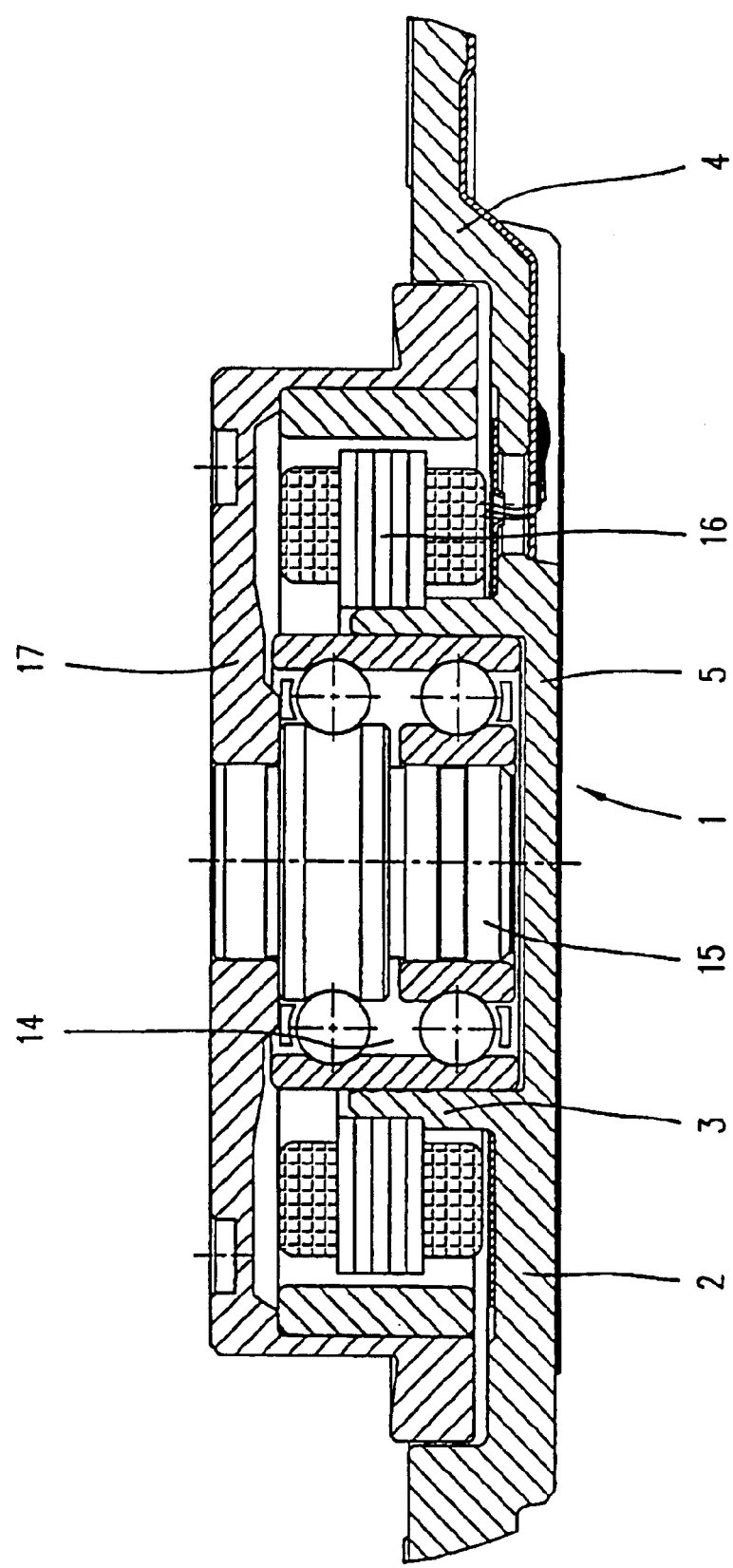
FIG. 3: section through a spindle motor with unilaterally closed receiving sleeve.

FIG. 1 depicts a casing part 1 developed according to the invention as can be applied in a spindle motor according to FIG. 3.

The casing part 1 comprises a flange portion 2, disposed approximately horizontally, in whose central region a receiving sleeve 3 is disposed, which forms a receiving space 6 for receiving a bearing configuration 14 and the shaft 15 of the spindle motor, as depicted in FIG. 3. At the outer edge the horizontal flange portion 2 transitions into an approximately truncated cone-form wall region 4 and forms a further annular receiving space 7 in which the electromagnetic circuit of the motor with the permanent magnets, the stator 16, and portions of the rotor 17 is received, wherein the rotor 17 rotates together with the shaft 15.

According to the invention the casing part 1 comprises a bottom portion 5, which is integrally developed with the horizontal flange portion 2 and which completely closes the receiving sleeve 3 from below. Thus, penetration of dirt into the bearing configuration 14 is prevented and the rigidity of the casing part 1 is increased.

For the through-guidance of cables and lines the casing part 1 can have a penetration opening 8.

Figure 2:
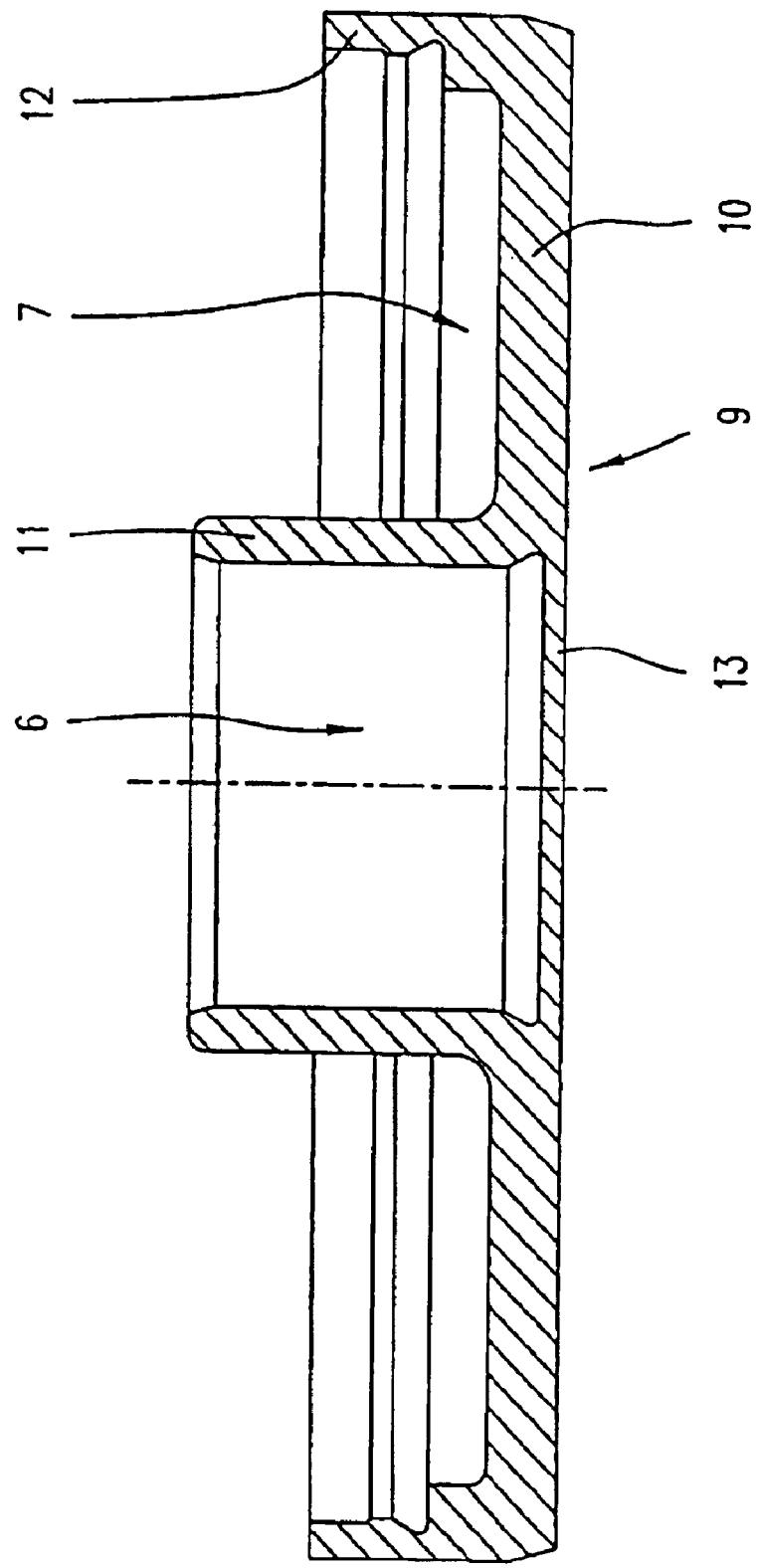
FIG. 2: section through a casing part with unilaterally closed receiving sleeve.

FIG. 2 depicts a different embodiment of a casing part 9 according to the invention, which comprises substantially the same characteristics as the above described casing part 1.

The casing part 9 comprises also a horizontal flange portion 10, which transitions into the receiving sleeve 11 disposed in the center. At the outer margin a wall 12 is provided which forms the receiving space 7 for the stator.

The receiving sleeve 11 is here also unilaterally closed according to the invention with a bottom portion 13.

FIG. 3 depicts a section through a spindle motor with inventive casing part 1, with the components of the spindle motor having already been described in connection with FIG. 1. It is essential that the motor is unilaterally closed completely from below through the bottom 5 integrated in the casing part 1, and the complex and expensive mounting of a separate cover, as was necessary within the scope of prior art according to FIG. 4, is omitted.

Figure 4:
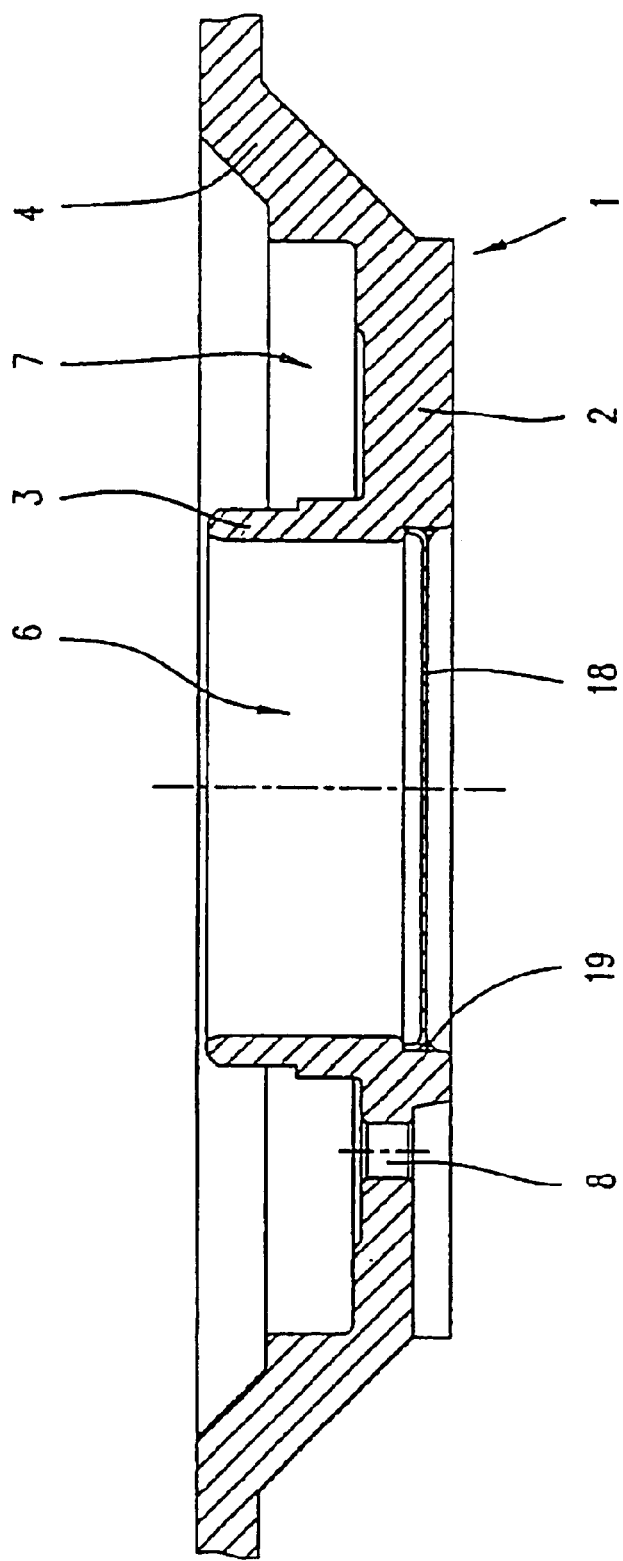
FIG. 4: a base plate according to prior art with separate cover adhered into the receiving sleeve.

FIG. 4 depicts a casing part 1 developed nearly identically as in FIG. 1 according to prior art, whose receiving sleeve 3 however is developed to be open on both sides, i.e. the casing part 1 at the bottom has an approximately circular central opening, which, after the assembly of the bearing configuration and the shaft, has been covered and closed by a cover 18 in order to prevent the penetration of dirt. The cover 18 was preferably adhered on the lower region of the receiving sleeve 3 by adhesive agents 19, which had been applied encirclingly. This meant high material and mounting expenditure, which is avoided with the invention.

Figure 5:
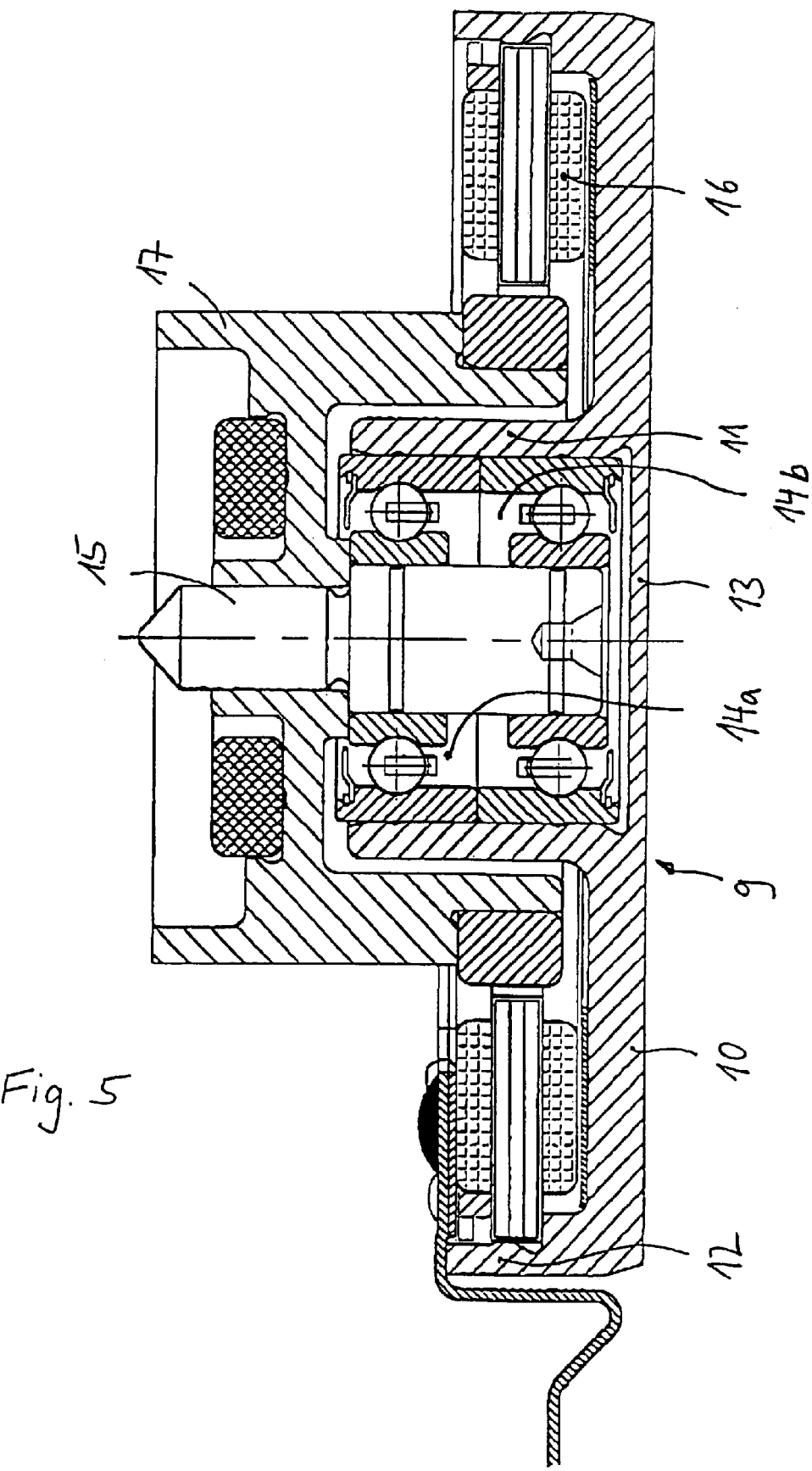
FIG. 5: another implementation of a spindle motor with unilaterally closed sleeve.

FIG. 5 depicts another implementation of a spindle motor with a casing part 9 developed according to the invention.

The structure of the casing part 9 has already been described in connection with FIG. 2. The receiving sleeve 11 forms a receiving space for receiving a bearing configuration 14a, 14b and the shaft 15 of the spindle motor.

The bearing configuration comprises two separate rolling bearings 14a, 14b. Each rolling bearing comprises an inner ring fixedly connected with the shaft 15 and an outer ring fixedly connected with the receiving sleeve 11. Between the inner and the outer rings corresponding rolling bearings are disposed.

I claim:

1. Spindle motor, in particular for driving hard disk drives, comprising a casing part (1; 9) with a horizontal flange portion (2; 10), a vertically oriented receiving sleeve (3; 11) for receiving and mounting a bearing configuration (14) comprising two rolling bearings (14a, 14b) with at least one inner ring and one outer ring for rotatably mounting a shaft (15) supporting a rotor (17) for rotation about a rotation axis, and a bottom portion (5; 13) integrally formed as one continuously monolithic structure with the horizontal flange portion (2; 10), which closes at one axial end the receiving sleeve (3; 11) at whose inner periphery the outer ring of the bearing configuration (14) is mounted.

2. Spindle motor as claimed in claim 1, characterized in that the thickness of the bottom portion (5; 13) is smaller than the thickness of the horizontal flange portion (2; 10).

3. Spindle motor as claimed in claim 1, characterized in that the bearing configuration (14) is spaced slightly apart with respect to the bottom portion (5; 13) of the receiving sleeve (3; 11).

4. Spindle motor as claimed in claim 1, characterized in that the rolling bearings (14a, 14b) have a common outer ring.

5. Spindle motor as claimed in claim 1, characterized in that the rolling bearings (14a, 14b) have separate outer rings.

6. Spindle motor as claimed in claim 1, characterized in that the stator (16) of the spindle motor is fastened on the outer periphery of the receiving sleeve (3; 11).

* * * * *